Aug. 4, 1964      B. G. LIFT      3,143,333
BEARING SUPPORT AND RETENTION OF INTEGRAL CHOKE UNIT
Filed April 3, 1961      2 Sheets-Sheet 1

INVENTOR.
BOB G. LIFT
BY Whittemore
Hulbert & Belknap
ATTORNEYS

Aug. 4, 1964 B. G. LIFT 3,143,333
BEARING SUPPORT AND RETENTION OF INTEGRAL CHOKE UNIT
Filed April 3, 1961 2 Sheets-Sheet 2
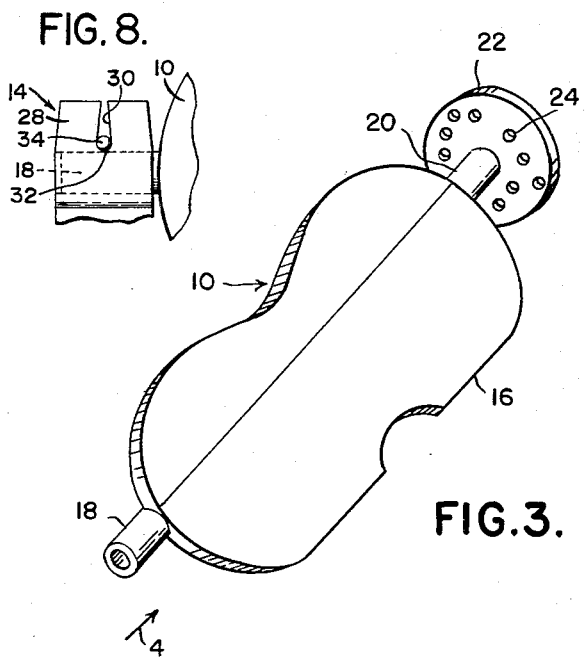
FIG. 8.
FIG. 3.
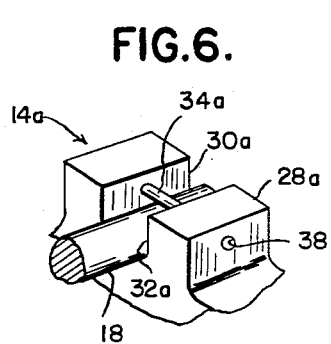
FIG. 6.
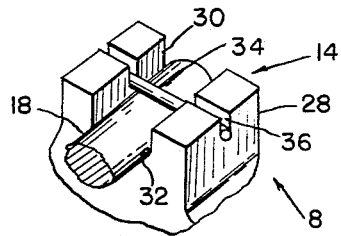
FIG. 5.
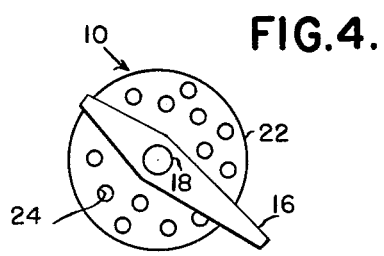
FIG. 4.
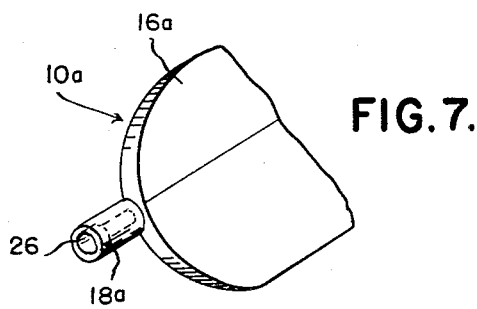
FIG. 7.
INVENTOR.
BOB G. LIFT
BY Whittemore
Hulbert & Belknap
ATTORNEYS United States Patent Office 3,143,333
Patented Aug. 4, 1964

3,143,333
BEARING SUPPORT AND RETENTION OF
INTEGRAL CHOKE UNIT
Bob G. Lift, Royal Oak, Mich., assignor to Holley Carburetor Company, Warren, Mich., a corporation of Michigan
Filed Apr. 3, 1961, Ser. No. 100,114
4 Claims. (Cl. 251—279)

The invention relates to valve assemblies and refers more particularly to an integral carburetor choke valve, mounting shaft and actuating lever, and mounting means therefor for use on carburetors in conjunction with internal combustion engines and similar devices.

In the past such valve assemblies have been constructed of a plurality of separate components including individual valve members, a mounting shaft therefor and an actuating lever together with screws or similar means for securing the valves, shaft and lever together in the assembly. The individual components of the prior structures must therefore be separately machined, stamped or otherwise produced and subsequently assembled. The construction of the valve assemblies in such manner is expensive and time consuming and therefore undesirable.

In addition it has been the practice in the past to machine openings through bosses or cast lugs in the member on which it is desired to mount the valve assembly and to insert the shaft for mounting the valve in the openings to provide a pivotally mounted valve. Again such mounting practices are undesirable due to the expense and time consumed in drilling the mounting holes in the device to which the valve assembly is to be secured.

It is therefore an object of the present invention to provide an integral valve and mounting shaft therefor for use as a choke valve on internal combustion engine carburetors or similar devices.

Another object is to provide an integral valve, mounting shaft and actuating lever for use as a choke valve on an internal combustion engine carburetor or similar device.

Another object is to provide a choke valve assembly as set forth above wherein the actuating lever is substantially universal whereby the integral choke valve assembly may be used in different installations.

Another object is to provide a choke valve assembly as set forth above which is constructed entirely of molded nylon, Delrin or other similar material, one advantage of which is that this material gives excellent anti-friction qualities.

Another object is to provide mounting means for a choke valve assembly including a mounting shaft comprising slots in mounting lugs on the device to which the valve assembly is to be mounted which slots are adapted to rotatably receive the ends of the shaft, and pins extending across the slots adapted to hold the shaft within the slots provided therefor.

Another object is to provide mounting means for a valve assembly as set forth above wherein the pins are positioned in grooves extending transversely of the slots and wherein the lugs are deformed after the pins have been positioned therein to partially close the grooves and hold the pins within the grooves.

Another object is to provide means for mounting a valve assembly as set forth above wherein the pin is inserted in a through opening in the lugs extending transversely of the slots therein.

Another object is to provide a valve assembly and mounting means therefor which is simple in construction, economical to manufacture and efficient in use.

Other objects and features of the invention will become apparent as the description proceeds, especially when taken in conjunction with the accompanying drawings, illustrating preferred embodiments of the invention, wherein:

FIGURE 3 is a perspective view of the integral valve, mounting shaft and universal actuating lever of the invention.

FIGURE 4 is an end view of the valve assembly shown in FIGURE 3 taken in the direction of arrow 4.

FIGURE 5 is a perspective view of mounting means for the valve assembly illustrated in FIGURE 3.

FIGURE 6 is a perspective view of another mounting means for the valve assembly illustrated in FIGURE 3.

FIGURE 7 is a perspective view of an integral valve and mounting shaft in accordance with the invention adapted to have a separate actuating lever secured thereto.

FIGURE 8 is an elevation view of the mounting means illustrated in FIGURE 5 taken in the direction of arrow 8 in FIGURE 5.

With particular reference to the figures of the drawings one embodiment of the invention will now be disclosed.

Figure 1:
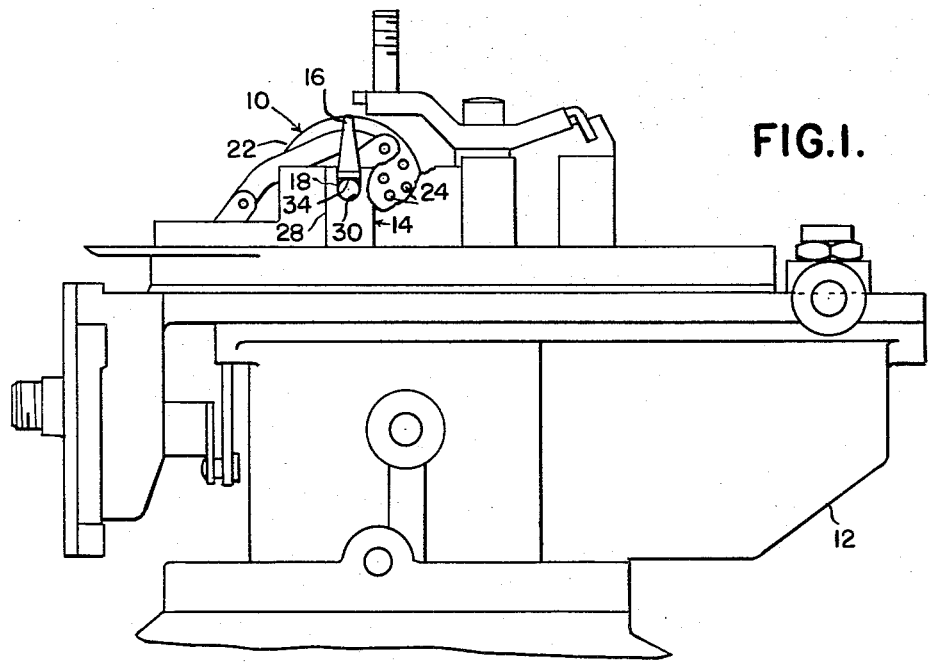
FIGURE 1 is an elevation view of a carburetor including a valve assembly and mounting means therefor constructed according to the invention.

As shown in FIGURE 1 an integral choke valve assembly 10 is rotatably secured to carburetor 12 by the improved mounting means 14. Due to the integral nature of the valve assembly 10 and the structure of the mounting means 14 the provision of the choke valve assembly in place on the carburetor 12 is particularly simple and economical as is the removal and replacement thereof.

More specifically the integral valve assembly 10, as shown best in FIGURE 3, comprises the choke plate 16 having the mounting shaft stubs 18 and 20 at opposite ends thereof and integral therewith. The choke valve 16 is pivotally mounted on the carburetor 12 by securing the shaft stubs 18 and 20 in the mounting means 14, as shown best in FIGURE 5.

The integral choke valve assembly 10 as shown in FIGURE 3 further includes the lever 22 integral with the shaft stub 20. Lever 22 is a circular disc and has a plurality of openings 24 extending therethrough at predetermined positions whereby the lever is substantially universal. That is to say, the lever 22 permits the use of the integral choke valve assembly in a plurality of predetermined installations requiring different actuating lever positioning and length.

The integral choke valve assembly 10, as shown in FIGURE 3, may be molded entirely of a plastic material, such as nylon, in a single molding operation or may be cast metal or similar material having the required strength, heat and solvent resistant properties which is easily formed into the configuration illustrated.

Thus with the integral choke valve assembly provided in accordance with the invention the separate machining of individual valve members, mounting shafts, levers, and connecting means therefor is eliminated. Further the time required for assembly of the individual parts and the necessity of storing the individual parts and the scheduling of the use thereof in production which is a considerable expense in production articles, such as carburetor choke valve assemblies is also eliminated.

A modification 10a of the choke valve assembly 10 is illustrated in FIGURE 7. The modified choke valve assembly of FIGURE 7 comprises a valve member 16a and integral mounting shaft stubs 18a and 20a entirely similar to those of the choke valve assembly 10. The choke valve assembly 10a does not however have an actuating lever integral therewith and instead is provided with recess 26 in the end of the shaft stub 18a to permit mounting of the usual actuating lever (not shown) by means of a self tapping screw. The choke valve assembly 10a may be used in applications wherein the universal actuating lever 22 is not desirable.

Figure 2:
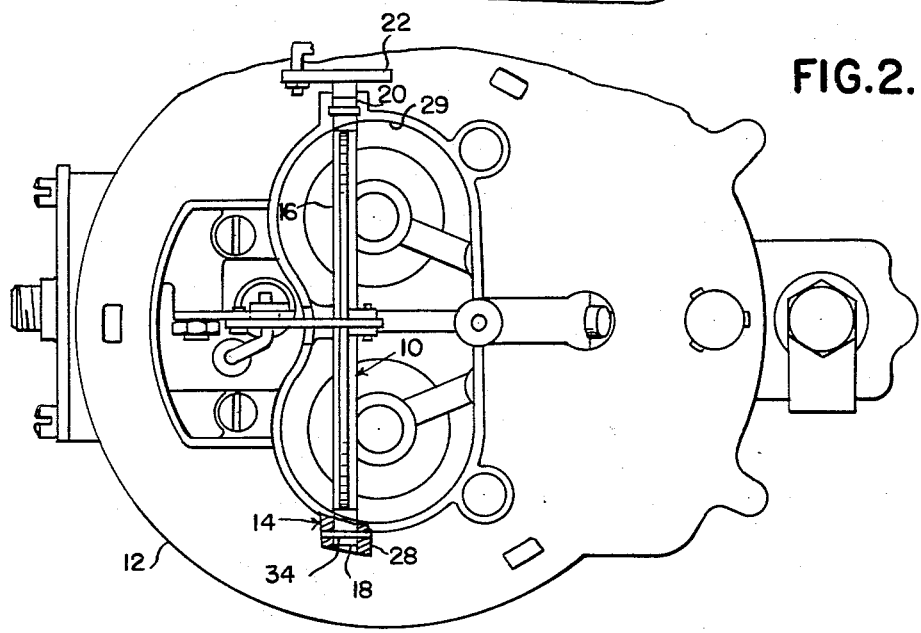
FIGURE 2 is a partially broken away top view of the carburetor, valve assembly and mounting means for the valve assembly illustrated in FIGURE 1.

The mounting means 14 for the choke valve assemblies 10 and 10a, illustrated in FIGURE 5, comprises the lugs 28 integral with the carburetor housing at each side of the air intake passage 29, as shown in FIGURES 1 and 2. Each of the separate lugs 28, as shown best in FIGURE 5, has a slot 30 therein which is contoured at the bottom 32 to rotatably receive the shaft stubs of the choke valve assemblies. The shaft stubs are held in position in the slots by means of a pin 34 seated in the bottom of a groove 36 in the lug 28 extending transversely of the slot 30 therein. The pin 34 is held in the groove 36 by deforming the lug 28 to tightly grip the pin 34 after the valve assembly and pin have been assembled. The pin 34 may be easily driven out of the groove 36 if it is desired to change the choke valve assembly.

The mounting means 14, as thus constructed, eliminates the necessity of machining through openings in the carburetor casting to mount the choke valve since the slot and groove can be cast in the carburetor housing without difficulty. Thus the mounting means 14 is simple in construction and efficient in the mounting of the integral choke valve assembly.

FIGURE 6 illustrates a modification 14a of the mounting means 14 shown in FIGURE 5. In the modified mounting means 14a a through opening 38 is drilled through the lug 28a transversely of the slot 30a and the pin 34a is held in the opening 38 by a press fit and extends transversely of the slot 30a as shown to rotatably secure the shaft stub in the slot 30a.

The drawings and the foregoing specification constitute a description of the improved carburetor choke plate assembly and mounting means therefor in such full, clear, concise and exact terms as to enable any person skilled in the art to practice the invention, the scope of which is indicated by the appended claims.

What I claim as my invention is:

1. Structure for rotatably mounting a shaft comprising a lug extending outwardly from a surface, a slot extending through said lug toward said surface having a depth greater than the diameter of the shaft to be rotatably mounted for receiving the shaft, a groove in said lug extending transversely of said slot and a shaft positioned in said slot and toward said surface, a pin located outwardly of said slot so as to be between the open end of the slot and a shaft positioned in the slot extending transversely of the lug and slot having ends located in said groove, said groove having side walls converging outwardly of said lug for firmly holding the pin within the groove.

2. In combination a carburetor having an air induction passage extending therethrough, an integral carburetor choke valve including a valve member, a mounting shaft and an actuating lever therefor, and a pivotal mounting for said mounting shaft comprising a lug attached to and extending outwardly of the carburetor at opposite sides of the air induction passage at each end of the shaft having a slot therein of depth greater than the diameter of said shaft, extending inwardly from the outermost surface of the lug toward the carburetor and receiving the corresponding shaft ends and means carried by the lugs positioned between the shaft ends and the open end of the slots for securing said shaft ends in the lug slots for rotation therein comprising a pin extending transversely of each of said slots outwardly of the lugs and slots with respect to the shaft ends in the slots and a groove in each of the lugs extending transversely of each of the shaft ends and slots receiving the ends of the pin and having side walls converging outwardly thereof for firmly holding the pin within the groove.

3. Structure as set forth in claim 2 wherein the actuating lever of the integral carburetor choke valve comprises a disc on the end of the mounting shaft having a plurality of angularly and radially spaced apart openings therein for connecting the choke valve in different installations requiring different actuating lever connections.

4. In a carburetor having an air induction passage extending therethrough, a single member carburetor choke valve including a valve portion, a mounting shaft portion and an actuating lever portion and a pivotal mounting for said mounting shaft portion comprising a lug extending outwardly of the carburetor, a slot extending through said lug of said carburetor having a depth greater than the diameter of the shaft portion of the choke valve for receiving the shaft portion thereof, a groove in said lug extending transversely of said slot and said shaft portion positioned in said slot, a pin located outwardly of said slot so as to be between the open end of the slot and the shaft portion positioned in the slot extending transversely of the lug and slot having ends located in said groove, said groove having side walls converging outwardly of said lug for firmly holding the pin within the groove.

References Cited in the file of this patent

UNITED STATES PATENTS

| | | |
|---|---|---|
| 183,061 | Locke | Oct. 10, 1876 |
| 971,047 | Knowles | Sept. 27, 1910 |
| 1,034,531 | Stump | Aug. 6, 1912 |
| 1,151,031 | Morgan | Aug. 24, 1915 |
| 1,204,094 | Waits | Nov. 7, 1916 |
| 1,242,621 | Watkins | Oct. 9, 1917 |
| 1,410,846 | Stewart | Mar. 28, 1922 |
| 1,550,614 | Hunt | Aug. 18, 1925 |
| 2,884,283 | Korol et al. | Apr. 28, 1959 |
| 2,952,495 | Herr | Sept. 13, 1960 |
| 2,966,344 | Ball | Dec. 27, 1960 |

FOREIGN PATENTS

| | | |
|---|---|---|
| 197 | Great Britain | Jan. 26, 1854 |